UNITED STATES PATENT OFFICE 2,437,797

NEW METAL SALTS OF ORGANIC PHOSPHINES AND PROCESSES OF MAKING THE SAME

Cheves Walling, Montclair, N. J., assignor to E. I. du Pont de Nemours & Company, Wilmington, Del., a corporation of Delaware No Drawing. Application July 13, 1944, Serial No. 544,837

6 Claims. (Cl. 260—607)

This invention relates to new metal salts of organic phosphines, and especially to such salts which contain one atom of metal linked to phosphorus in the molecule, and to processes for manufacturing the new compounds.

It is among the objects of this invention to provide new metal salts of organic phosphines which contain one metal atom and one or two monovalent organic radicals in the molecule. Another object of the invention is to provide new methods for manufacturing such metal salts. Other objects of the invention will be apparent from the following description.

The objects of the invention are attained in general by reacting an organic primary or secondary phosphine with an equimolecular proportion of an alkali metal in an inert non-oxidizing liquid solvent, the reaction being carried out under a non-oxidizing protective layer, such as a layer of a non-oxidizing gas or liquid. In this reaction the alkali metal replaces one hydrogen of an organic primary or secondary phosphine. The organic phosphines which are suitable as reactants in the process are the primary and secondary phosphines represented by the formulae $PH_2R$ and $PRR'H$ wherein R and R' are each like or unlike radicals of the group consisting of the aliphatic, aralkyl, alicyclic and aryl series. The materials are very easily oxidized. They ignite spontaneously in contact with air, often-times with explosive violence and must be stored under a blanket of nitrogen or other inert gas. The products are represented in general by the formulae $PHRMe$ and $PRR'Me$ wherein Me represents an alkali metal.

The invention will be more fully set forth in the following more detailed description which includes examples that are given as illustrative embodiments of the invention and not as limitations thereof. Parts are expressed in parts by weight unless otherwise noted.

Example I

A slight excess over 1 mol (90 parts) of n-butyl phosphine was slowly added with stirring to a solution made by dissolving 1 mol of sodium in 500 parts of liquid ammonia. The mixture was contained in a flask which was cooled to maintain a temperature of −45° to −35° C. and nitrogen was passed into the flask to maintain a non-oxidizing inert atmosphere over the reaction mixture. Stirring was continued until the blue color which is characteristic of solutions of sodium in liquid ammonia had disappeared and the sodium salt of the n-butyl phosphine was formed. The product was a dark solid, partially soluble in the reaction mixture, having a composition which is represented by the formula $(C_4H_7)PHNa$.

By using an equivalent proportion of another alkali metal, such as potassium, lithium, or rubidium instead of 90 parts of sodium in the foregoing procedure, the corresponding alkali metal phosphine salts of these metals are made.

Example II

Four parts of metallic potassium were suspended in 40 parts of benzene in a flask which was provided with a reflux condenser and exterior heating and cooling means. The flask was provided with means to pass nitrogen over the solution during the reaction and 9 parts of n-butyl phosphine were slowly added whilst allowing the liquid to warm and passing in nitrogen. The mixture was then heated to refluxing temperature and stirred until the potassium was consumed. Prepared in this way, the potassium salt of n-butyl phosphine was obtained as a white flocculent precipitate.

By using an equivalent proportion of any of the other alkali metals in the procedure of Example II instead of 4 parts of potassium, the corresponding salts of these metals are formed.

In place of 9 parts of n-butyl phosphine in the procedure of Example II, an equivalent proportion of any other primary organic phosphine having the formula $PH_2R$ wherein R is a radical of the aliphatic, aralkyl, alicyclic or aryl series may be employed in the foregoing examples, as for example ethyl-, octadecyl-, sec. amyl-, allyl-, benzyl-, cyclohexyl-, or phenyl-phosphine.

Example III

The potassium salt of diethyl phosphine was made by adding 100 parts of diethyl phosphine to a suspension of potassium in toluene which consisted of 39 parts of potassium and 100 parts of toluene. The mixture at refluxing temperature was allowed to reflux whilst passing nitrogen into the flask until the potassium was combined with the diethyl phosphine, yielding a flocculent precipitate of $(C_2H_5)_2PK$.

By using an equivalent proportion of a secondary organic phosphine of the formula $PHRR'$ instead of the n-butyl phosphine used in the procedure of Example I or Example II, or the diethyl phosphine of Example III, the corresponding alkali metal salts are made satisfactorily. In such secondary phosphines of the formula $PHRR'$, the organic radicals may be alike or different and each is a radical of the group consisting of the aliphatic, aralkyl, alicyclic and aryl series.

When a compound is used as a starting compound in the processes described, such as diisopropyl-, alkyl-ethyl-, methyl-benzyl-, methyl-cyclohexyl-, ethyl-phenyl-, dibenzyl-, benzyl-cyclopentyl-, benzyl-naphthyl-, di-borneyl-, cyclohexyl-phenyl or di-p-tolyl-phosphine, the corresponding alkali metal salt of the secondary phosphine is formed.

As the solvent in the process, any non-oxidizing compound which is liquid at the reaction temperature and is non-reactive towards the reactants and is a solvent for at least one of them can be used. Such solvents are referred to in this specification and claims as inert non-oxidizing liquid solvents. As illustrative of such solvents besides those mentioned are low molecular weight amines, hydrocarbons such as hexane, cyclohexane, benzene, and toluene, and ethers such as diethyl ether and dioxane. As illustrated in Examples I, II and III, this reaction may be carried out over a wide range of temperatures. In general, higher temperature favors a more rapid reaction between the phosphine and the metal, but it also favors side reactions and decomposition. Although the optimum temperature varies with the phosphine, the alkali metal and the solvent, in general an operating temperature between about $-50°$ and about $+200°$ C. can be used.

The new metal salts find extensive use for many purposes. For example, they may be used as intermediates for manufacturing other organic phosphines, such as the preparation of n-butyl-ethyl phosphine, which can be made by reacting in an inert liquid medium and at a suitable temperature the sodium salt of the n-butyl phosphine described in Example I with ethyl bromide. When the sodium salt of a phosphine which contains two alkyl radicals is similarly reacted with an aliphatic halide, an organic phosphine containing three organic radicals of the reactants may be made. By the use of the metal phosphines in such processes, a large variety of mixed organic phosphines or phosphines in which all organic radicals are alike can be readily prepared by a proper selection of the reactants.

From the foregoing disclosure it will be recognized that the invention is susceptible of modification without departing from the spirit and scope thereof and it is to be understood that the invention is not restricted to the specific illustrations thereof herein set forth.

I claim:

1. A metal salt of an organic phosphine represented by the formula PRR'Me, wherein R is a member of the group consisting of alkyl radicals of 2 to 18 carbon atoms and allyl, benzyl, cyclohexyl, cyclopentyl, borneyl, phenyl, tolyl and naphthyl radicals, and wherein R' is a member of the group consisting of hydrogen, alkyl radicals of 1 to 18 carbon atoms and allyl, benzyl, cyclohexyl, cyclopentyl, borneyl, phenyl, tolyl and naphthyl radicals.

2. The sodium salt of n-butyl phosphine.

3. The potassium salt of n-butyl phosphine.

4. The potassium salt of diethyl phosphine.

5. The process which comprises making a mixture in an inert non-oxidizing organic solvent which is a liquid under atmospheric pressure at approximately room temperature of equimolecular proportions of an alkali metal and an organic phosphine represented by the formula PHRR', wherein R is a member of the group consisting of alkyl radicals of 2 to 18 carbon atoms and allyl, benzyl, cyclohexyl, cyclopentyl, borneyl, phenyl, tolyl and naphthyl radicals, and wherein R' is a member of the group consisting of hydrogen, alkyl radicals of 1 to 18 carbon atoms and allyl, benzyl, cyclohexyl, cyclopentyl, borneyl, phenyl, tolyl and naphthyl radicals, and retaining said mixture at reaction temperature until hydrogen of said phosphine is replaced by said alkali metal to form a metal salt represented by the formula PRR'Me wherein Me designates the alkali metal.

6. The process in accordance with claim 5 in which the reaction is carried out at the refluxing temperature.

CHEVES WALLING.

REFERENCES CITED

The following references are of record in the file of this patent:

Albers et al., Ber. Deut. Chem., vol. 76B, pages 23–26 (1943).

Mellor, Comprehensive Treatise on Inorganic and Theoretical Chemistry, vol. 8, pages 834, 835.

Richter, Organic Chemistry, Spielmann's translation, 2nd ed., pages 173–174.

Feiser, Organic Chemistry, 1944, page 32.